(12) United States Patent
Waters et al.

(10) Patent No.: US 7,897,907 B1
(45) Date of Patent: Mar. 1, 2011

(54) SYSTEM AND METHOD FOR INCREASING SIGNAL-TO-NOISE RATIO IN OPTICAL-BASED SENSOR SYSTEMS

(75) Inventors: Richard L. Waters, San Diego, CA (US); Mark S. Fralick, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 443 days.

(21) Appl. No.: 12/108,829

(22) Filed: Apr. 24, 2008

(51) Int. Cl.
*H01J 40/14* (2006.01)
*G01J 1/32* (2006.01)

(52) U.S. Cl. .................. 250/214 R; 250/205

(58) Field of Classification Search .......... 250/205, 250/214 R
See application file for complete search history.

(56) References Cited

U.S. PATENT DOCUMENTS

| | | | |
|---|---|---|---|
| 4,052,161 A | 10/1977 | Atwood et al. | |
| 4,189,753 A * | 2/1980 | Parsons et al. | 358/482 |
| 4,396,353 A | 8/1983 | MacDonald | |
| 4,577,209 A * | 3/1986 | Forrest et al. | 257/432 |
| 4,622,459 A | 11/1986 | Bouge et al. | |
| 4,731,744 A | 3/1988 | Harrell, Jr. et al. | |
| 4,770,536 A * | 9/1988 | Golberstein | 356/600 |
| 4,809,039 A | 2/1989 | Ishii | |
| 4,973,844 A | 11/1990 | O'Farrell et al. | |
| 5,371,360 A | 12/1994 | Bardos et al. | |
| 5,631,165 A | 5/1997 | Chupp et al. | |
| 5,656,499 A | 8/1997 | Chupp et al. | |
| 5,812,419 A | 9/1998 | Chupp et al. | |
| 5,891,734 A | 4/1999 | Gill et al. | |
| 5,939,326 A | 8/1999 | Chupp et al. | |
| 6,114,698 A | 9/2000 | Lehman et al. | |
| 6,194,709 B1 | 2/2001 | Briggs et al. | |
| 6,231,732 B1 | 5/2001 | Hollars et al. | |
| RE037,354 E | 9/2001 | Welch et al. | |
| 6,580,503 B2 | 6/2003 | Gharib et al. | |
| 6,589,489 B2 | 7/2003 | Morrow et al. | |
| 2002/0168305 A1 | 11/2002 | Morrow et al. | |
| 2007/0030573 A1 | 2/2007 | Batchko et al. | |

* cited by examiner

*Primary Examiner*—Thanh X Luu
(74) *Attorney, Agent, or Firm*—Ryan J. Friedl; Kyle Eppele

(57) ABSTRACT

A method includes passing a portion of an optical signal through an aperture of a sensor having a sensing element, wherein the portion of the optical signal that passes through the aperture is an inner portion of the optical signal and the portion of the optical signal that does not pass through the aperture is an outer portion of the optical signal; producing a sensed signal by sensing the outer portion of the optical signal with the sensing element; and controlling the source of the optical signal using the sensed signal. A system for implementing the method includes an optical energy source and a sensor having an optical sensing portion and an aperture therein. The system may also include an optical isolator, a detection element, and a controller for controlling the optical energy source. The system may be used within a MEMS-based system.

17 Claims, 4 Drawing Sheets

SYSTEM AND METHOD FOR INCREASING SIGNAL-TO-NOISE RATIO IN OPTICAL-BASED SENSOR SYSTEMS

FEDERALLY-SPONSORED RESEARCH AND DEVELOPMENT

The System and Method for Increasing Signal-to-Noise Ratio in Optical Based Detection Systems was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil, reference Navy Case No. 98183.

BACKGROUND

Extensive work has been performed to utilize optical systems for high-end sensor designs. However, unlike digital communications where a signal is interpreted as either a logic high or logic low value, analog sensors must be able to discern a wide range of continuous values. The ability to extend an analog sensor's range of continuous values, as well as increase its resolution within this range, greatly enhances the utility and functionality of such a sensor for high-end applications.

To increase dynamic range and resolution within a dynamic range, feedback control can be used. Feedback control can come from a sensor system illuminated by a light emission source or from a back-reflection of light from a semi-transparent glass cap that is used to seal a discrete light emission system. Both examples can be found in commercially available systems.

While useful, both approaches have several drawbacks and do not fully realize the signal-to-noise ratio (SNR) potential of a light emission system. For example, if a semi-transparent glass cap is mounted directly behind a light source to create back-reflections to a diode, some light may be directly reflected back to the light source. Unfortunately, such feedback directly into the light source can decrease the SNR. This approach can also preclude direct packaging of a light source with the optical sensor system, increasing the size of the optical system. Generally, only light that is reflected at a large enough angle can travel beyond the edge of the light emission source and become collected photo current in a photodiode mounted behind the light source. This unfortunately can reduce the total amount of light available, decreasing the SNR of the respective photodiode. A decrease in SNR makes it more difficult to accurately control and adjust the light source.

There is a need for a system and method for increasing the SNR in optical based detection systems.

DETAILED DESCRIPTION OF SOME EMBODIMENTS

Figure 1:
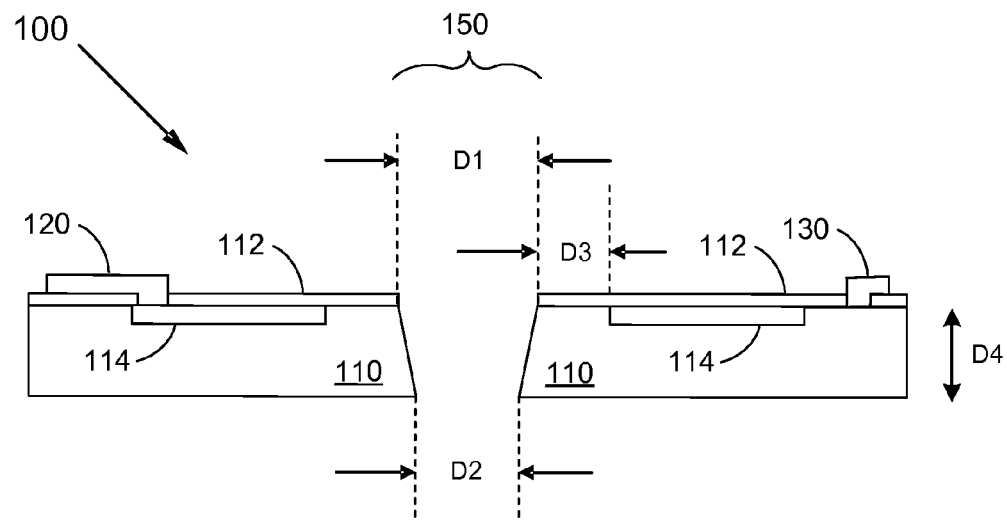
FIG. 1 shows a cross-section view of an embodiment of a sensor in accordance with the System and Method for Increasing Signal-to-Noise Ratio in Optical Based Sensor Systems.
Figure 2:
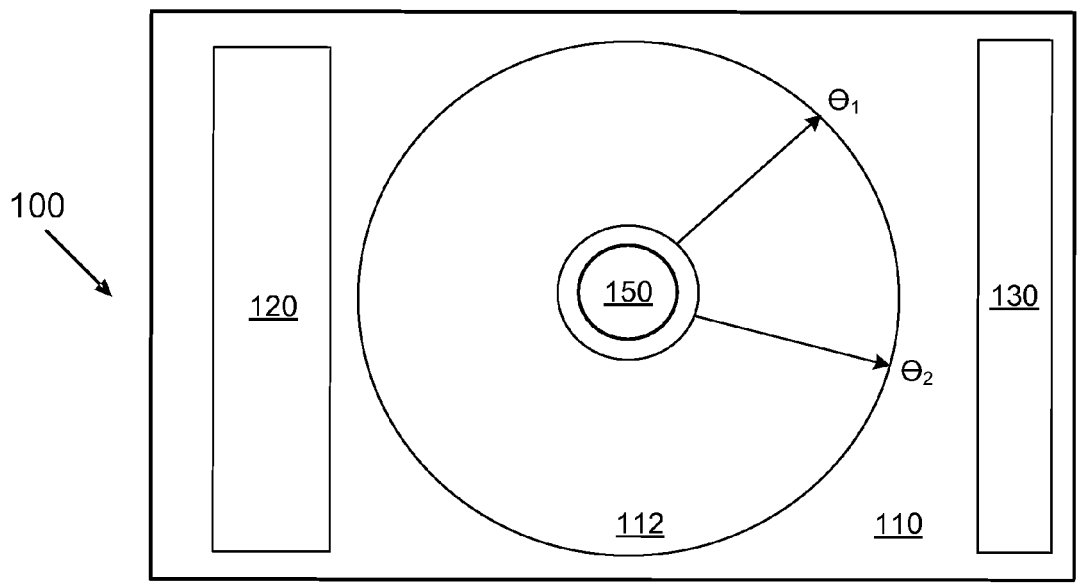
FIG. 2 shows a plan view of an embodiment of a sensor in accordance with the System and Method for Increasing Signal-to-Noise Ratio in Optical Based Sensor Systems.

Referring to FIGS. 1 and 2, FIG. 1 shows a cross-section view of an embodiment of a sensor 100 in accordance with the System and Method for Increasing Signal-to-Noise Ratio in Optical Based Sensor Systems, while FIG. 2 shows a plan view of sensor 100. In some embodiments, sensor 100 is a photodiode sensor, such as a monitor photodiode sensor. Sensor 100 includes a body 110, which also serves as a cathode, an anode 114 in contact with body 110, an anode contact 120, and a cathode contact 130. In some embodiments, sensor 100 includes a transparent coating 112 disposed on the top surface of sensor 100. The spacing between body 110 and anode 114 may be determined by the required breakdown voltage of the system, where a large spacing implies a larger breakdown voltage, but at the expense of increased surface leakage currents. The thickness of sensor 100 (see dimension D4 in FIG. 1) may be varied to meet specific application requirements. As an example, the thickness of sensor 100 may be 125 µm. Depending on the method of assembly and packaging, anode contact 120 and cathode contact 130 may either be located on the same side of sensor 100 or on opposite sides of sensor 100.

In some embodiments, anode 114 may be ring-shaped. In some embodiments, anode 114 is annular-ring shaped. In some embodiments, anode 114 comprises other shapes, such as square or oval. In some embodiments, anode 114 is the optical sensing portion of sensor 100. In operation, anode 114 may sense optical energy emitted from an optical source, such as a laser or light-emitting diode (LED), that would otherwise diverge and be lost to the system.

Sensor 100 includes an aperture 150 therein. In some embodiments, optical energy that is not sensed by anode 114 passes through aperture 150. In some embodiments, aperture 150 is located within the center of anode 114. In some embodiments, aperture 150 has a greater diameter D1 at the top of sensor 100, a lesser diameter D2 at the bottom of sensor 100, and a sloping-surface connecting the upper part of aperture 150 with the lower part of aperture 150. As an example, diameter D1 may be 20 µm and diameter D2 may be 15 µm. In some embodiments, aperture 150 has a uniform diameter throughout sensor 100. In some embodiments, anode 114 has an inner radius separated from the greater diameter D1 by distance D3. As an example, distance D3 is 5 µm. In other embodiments, the inner radius of anode 114 is defined by the perimeter of aperture 150. The dimensions of aperture 150 and anode 114 may vary based upon the spacing between an optical energy source and sensor 100, as well as the amount of optical energy required to be incident on a target detector (see FIG. 4). Aperture 150 may be created using a Deep Reactive Ion Etch process, Ion Milling, laser etching or other equivalent process as recognized by one having ordinary skill in the art.

In embodiments wherein anode 114 is ring-shaped or circular, anode 114 may sense optical energy for each angle θ, and integrate sensed light for each angular range, such as $\theta_1$ to $\theta_2$ shown in FIG. 2. In some embodiments, anode 114 may sense and integrate optical energy at an angular range of about $2\pi$ radians. While the sensing/integration of optical energy by anode 114 about $2\pi$ radians may provide the best possible results, it is possible that in other embodiments, lesser angular ranges may be employed, e.g., $3\pi/4$, $\pi$, $\pi/2$ or any angular range of $(n/m)\pi$ where n and m are positive integers.

In some embodiments, sensor 100 may have multiple sensing elements. For example, rather than use a single anode-cathode pair with an angular range of $2\pi$, sensor 100 may employ four separate diodes each having an angular range of $\pi/2$, or any other combination of diodes to produce a desired sensing range.

Figure 3:
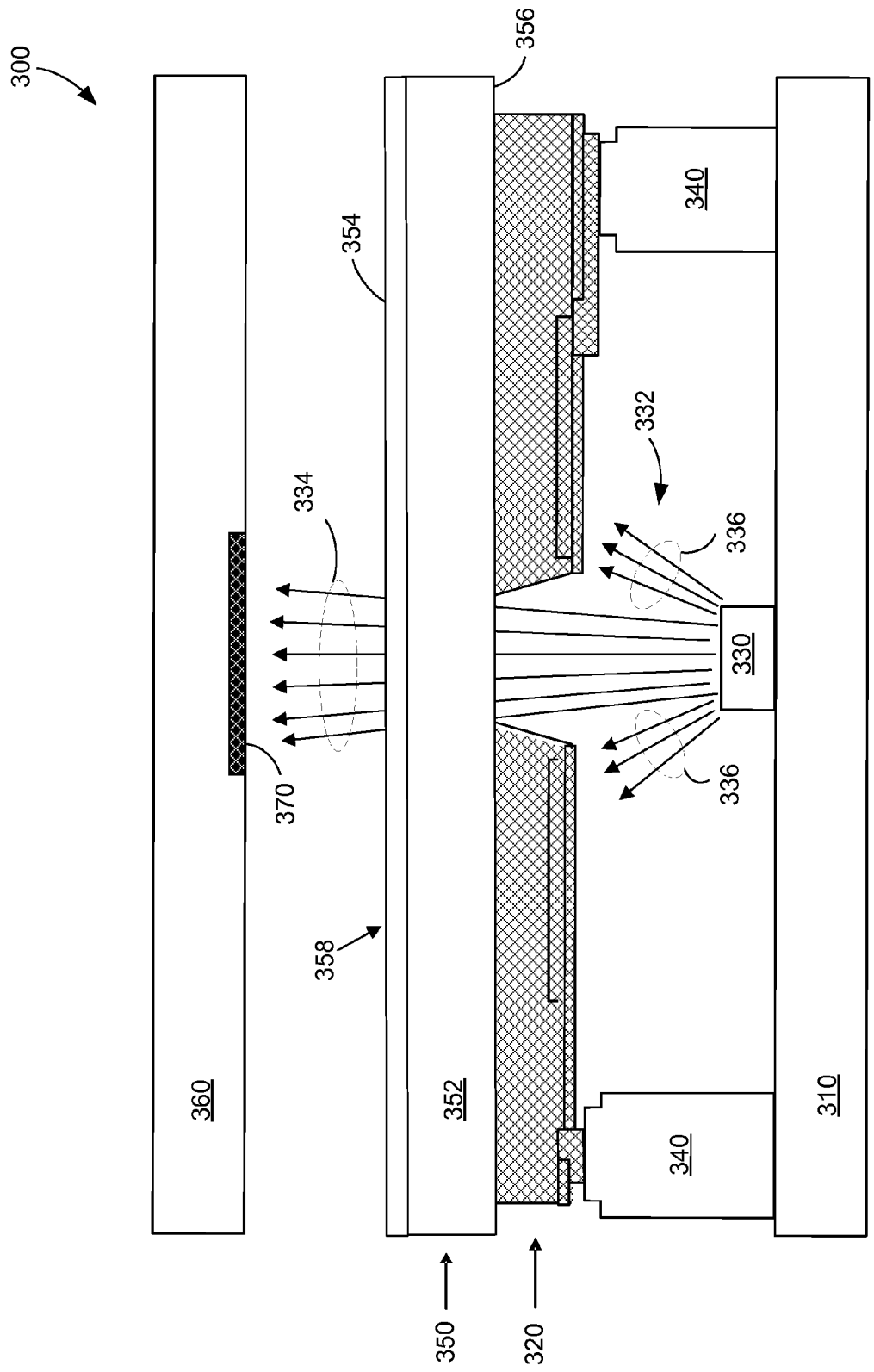
FIG. 3 shows a cross-section view of an embodiment of a system in accordance with the System and Method for Increasing Signal-to-Noise Ratio in Optical Based Sensor Systems.

FIG. 3 shows a cross-section view of an embodiment of a system 300 in accordance with the System and Method for Increasing Signal-to-Noise Ratio in Optical Based Sensor Systems. System 300 includes a platform 310, a sensor 320, an optical energy source 330, an optical isolator 350, and a target platform 360. Sensor 320 may be coupled to platform 310 via spacers 340. Sensor 320 may be identical to sensor 100 shown in FIGS. 1 and 2. Optical energy source 330 may be coupled to platform 310. Optical energy source 330 is configured to produce an optical signal 332 having a power level. An example of an optical energy source 330 is a laser or an LED. Sensor 320 may be configured to transmit the sensed signal to optical energy source 330. Optical energy source 330 may be configured to receive the sensed signal and use the sensed signal to control optical energy source 330, such as by controlling the power level of optical signal 332. System 300 may be located within a MEMS-based system.

Sensor 320 may have an optical sensing portion and an aperture therein. In some embodiments, the optical sensing portion is the sensor anode. The optical sensing portion may be configured to sense a portion 336 of optical signal 332. Sensor 320 may be configured to produce a sensed signal (see signal 424 of FIG. 4A and signal 464 of FIG. 4B) by sensing portion 336 of optical signal 332 with the optical sensing portion. Portion 336 may be referred to as the "outer" portion of optical signal 332. The aperture allows a portion 334 of optical signal 332 to pass through sensor 320. Portion 334 may pass through sensor 320 to a detection element 370 coupled to a detection element platform 360. Portion 334 may be referred to as the "inner" portion of optical signal 332. The inner portion of optical signal 332 has a total noise source that correlates to a total noise source of the outer portion 336 of optical signal 332. In some embodiments, the total noise source of the inner portion 334 of optical signal 332 is substantially equal to the total noise source of the outer portion 336 of optical signal 332. In some embodiments, detection element 370 is a sensor. In some embodiments, detection element 370 is a reflective surface.

In some embodiments, system 300 may include an optical isolator 350. In some embodiments, optical isolator 350 may be coupled to sensor 320. In such embodiments, optical isolator 350 may be coupled to sensor 320 by any means required for the specific application. As an example, optical isolator 350 may be coupled to sensor 320 via an optically transparent epoxy.

Optical isolator 350 may comprise a linear polarizer 352 having a quarter-wave plate 354 coupled thereto, such as $\lambda/4$, $3\lambda/4$, etc. One side of optical isolator 350 may have an anti-reflective coating 356, while the other side of optical isolator 350 may have an anti-reflective coating 358. Coatings 356 and 358 may be of the appropriate wavelength to help reduce unwanted reflection from detection element 370 into optical energy source 330.

In some embodiments, optical isolator 350 causes the portion 334 of optical signal 332 passing through optical isolator 350 to be clockwise circularly polarized. Any of the portion 334 of optical signal 332 that reflects from detection element 370 will be counter-clockwise circularly polarized. This reflected optical signal will then encounter quarter-wave plate 354 to create a linearly polarized optical signal that is ninety degrees out of phase with linear polarizer 352. In turn, linear polarizer 352 will substantially block all reflected optical energy from detection element 370 that would otherwise be reflected back to optical energy source 330. The reduced reflected optical energy to optical energy source 330 increases the SNR of optical energy source 330.

Figure 4A:
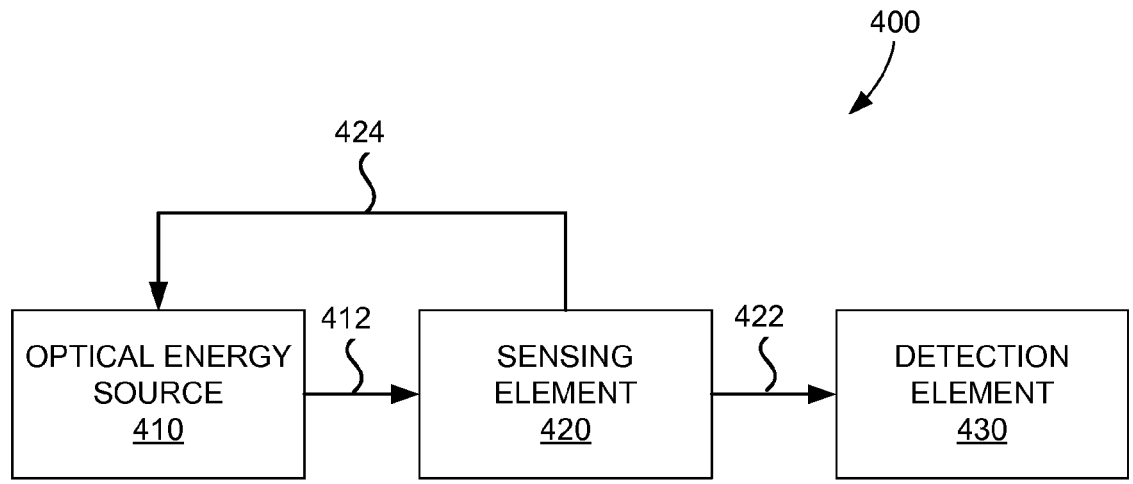
FIGS. 4A and 4B show block diagrams illustrating systems having feedback control in accordance with the System and Method for Increasing Signal-to-Noise Ratio in Optical Based Sensor Systems.
Figure 4B:
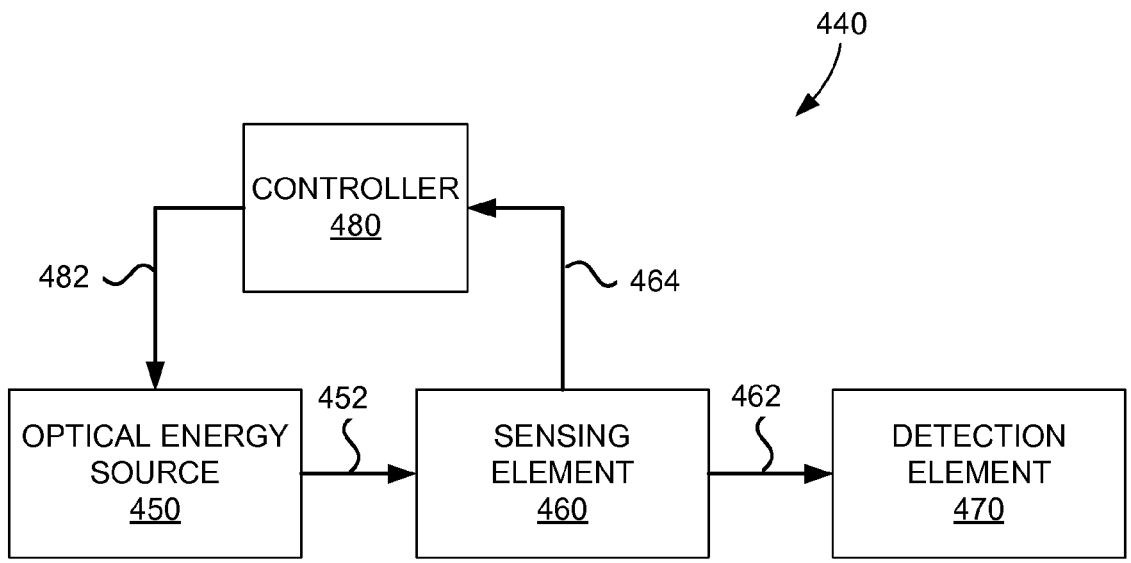

FIGS. 4A and 4B show block diagrams illustrating systems having feedback control in accordance with the System and Method for Increasing Signal-to-Noise Ratio in Optical Based Sensor Systems. FIG. 4A shows a system 400 having an optical energy source 410, a sensing element 420, and a detection element 430. Optical energy source 410 is configured to produce an optical signal 412. Optical signal 412 is transmitted to sensing element 420. As an example, sensing element 420 may be identical to sensors 100 and 320 described herein. Sensing element 420 allows a portion 422 of optical signal 412 to pass to detection element 430. Portion 422 may be referred to as the "inner" portion of optical signal 412.

Sensing element 420 produces a sensed signal 424 by sensing another portion of optical signal 412. As an example, for a sensing element 420 having a circular or ring-shaped optical sensing portion with a circular aperture therein, sensing element 420 allows a portion of optical signal 412 defined by the diameter of the aperture to pass through to detection element 430, while a portion of optical signal 412 external to the diameter of the aperture is sensed by the optical sensing portion of sensing element 420. The portion of optical signal 412 sensed by the optical sensing portion of sensing element 420 may be referred to as the "outer" portion of optical signal 412.

As shown, sensing element 420 transmits sensed signal 424 back to optical energy source 410. In one embodiment, sensed signal 424 may be transmitted back to optical energy source 410 by means of electronic feedback. The electronic feedback may have analog or digital controller implementation. Sensed signal 424 is used to control optical energy source 410. As an example, sensed signal 424 is used to control the power level of optical energy source 410. In one embodiment, sensed signal 424 may control the power level of optical energy source 410 by controlling a voltage or current supplied to optical energy source 410 via electronic feedback circuitry.

FIG. 4B shows a system 440 having an optical energy source 450, a sensing element 460, and a detection element 470. Optical energy source 450 is configured to produce an optical signal 452. Optical signal 452 is transmitted to sensing element 460. As an example, sensing element 460 may be identical to sensors 100 and 320 described herein. Sensing element 460 allows a portion 462 of optical signal 452 to pass to detection element 470. Portion 462 may be referred to as the "inner" portion of optical signal 452.

Sensing element 460 produces a sensed signal 464 by sensing another portion of optical signal 452. As an example, for a sensing element 460 having a circular or ring-shaped optical sensing portion with a circular aperture therein, sensing element 460 allows a portion of optical signal 452 defined by the diameter of the aperture to pass through to detection element 470, while a portion of optical signal 452 external to the diameter of the aperture is sensed by the optical sensing portion of sensing element 460. The portion of optical signal 452 sensed by the optical sensing portion of sensing element 460 may be referred to as the "outer" portion of optical signal 452.

As shown, sensing element 460 transmits sensed signal 464 to a controller 480. Controller 480 uses sensed signal 464 to control optical energy source 450 via control signal 482. As an example, controller 480 uses sensed signal 464 to produce control signal 482, which may serve to control the power level of optical energy source 450.

Without the feedback control provided by the described systems, such as systems 400 and 440, the intensity of the optical energy sources may vary due to factors such as the age and ambient temperature of the optical energy source. Such variance can reduce the SNR created within systems 400 and 440. Controlled feedback allows for subsequent common-mode subtraction of the correlated noise to increase the effective SNR of the optical system.

Figure 5:
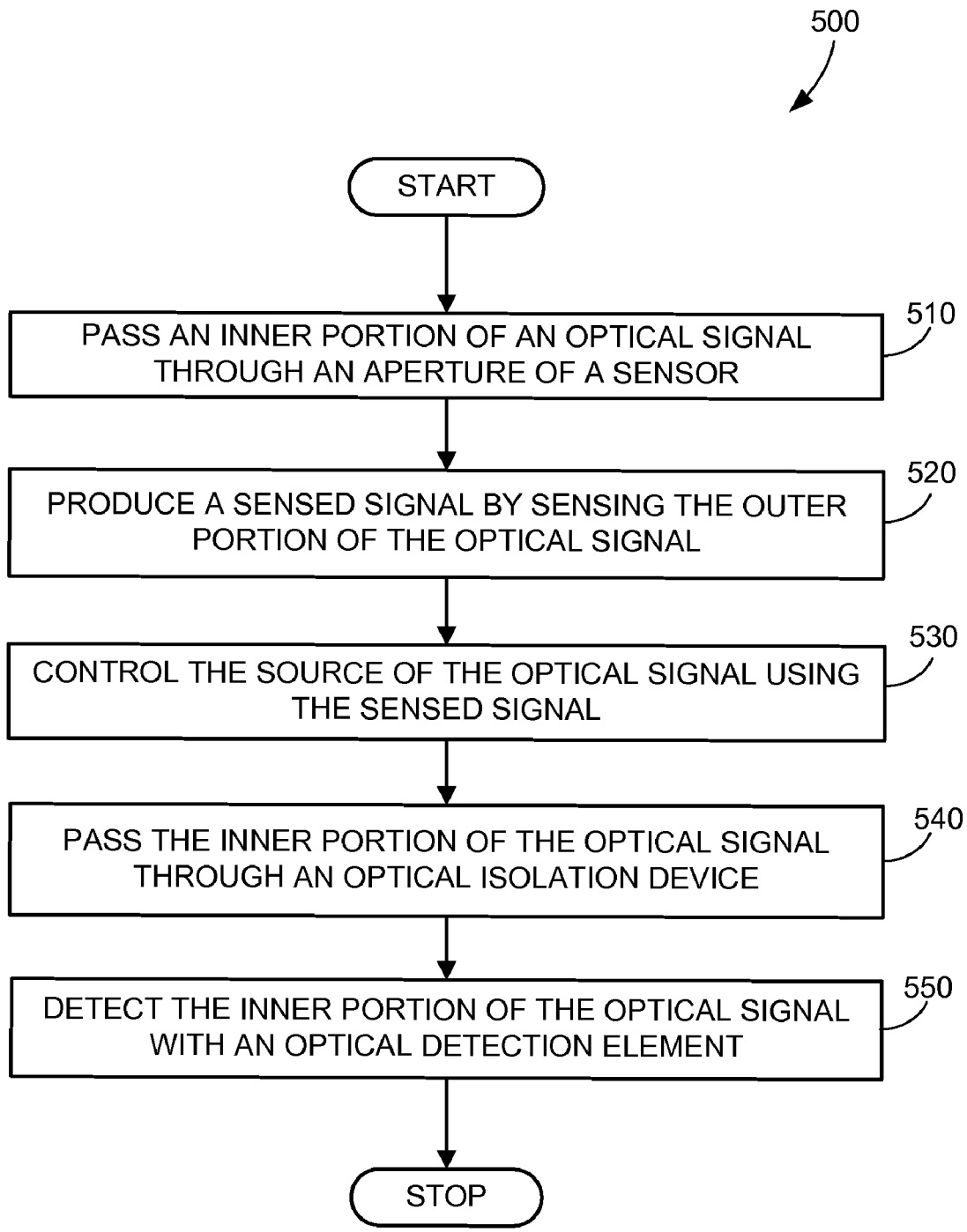
FIG. 5 shows a flowchart illustrating an embodiment of a method in accordance with the System and Method for Increasing Signal-to-Noise Ratio in Optical Based Sensor Systems.

FIG. 5 shows a flowchart illustrating an embodiment of a method 500 in accordance with the System and Method for Increasing Signal-to-Noise Ratio in Optical Based Sensor Systems. Method 500 may be used within systems 100, 300, 400, and 440 as discussed herein. For illustration purposes, method 500 will be discussed with reference to systems 300 and 400.

Method 500 may begin at step 510, wherein a portion 334 of an optical signal 332 having a power level is passed through an aperture of a sensor 320 having a sensing element. The portion 334 of the optical signal 332 that passes through the aperture is the inner portion of optical signal 332 and the portion 336 of optical signal 332 that does not pass through the aperture is the outer portion of optical signal 332.

Method 500 may proceed to step 520, which involves producing a sensed signal by sensing the outer portion 336 of optical signal 332 with the sensing element of sensor 320, which may be the anode of sensor 320. As an example, step 520 may involve sensing and integrating the outer portion 336 of optical signal 332 about at least a first angle of the sensing element. In some embodiments, the first angle exceeds $\pi$ radians. In other embodiments, the first angle is less than or equal to it radians. Step 520 may involve sampling optical signal 332 about an n-degree range at or near the perimeter of the sensing element. In some embodiments, step 520 involves sensing and integrating the outer portion of the optical signal over symmetrical segments of the sensing element.

Step 530 involves controlling the source of the optical signal using the sensed signal (see FIG. 4A). As an example, step 530 may involve providing feedback 424 to a source 410 of the optical signal 412 to control the power level of the source of optical signal 412. Step 540 involves passing the inner portion 334 of the optical signal 332 through an optical isolation device 350 (see FIG. 3). Step 550 involves detecting the inner portion 334 of the optical signal 332 with a detection element 370 (see FIG. 3).

It should be recognized that step 520 may occur prior to steps 540 and 550, simultaneously as steps 540 and 550, or subsequent to steps 540 and 550. Further, step 530 may occur prior to steps 540 and 550, simultaneously as steps 540 and 550, or subsequent to steps 540 and 550.

Method 500 may be implemented using a programmable device, such as a computer-based system. Method 500 may be implemented using various programming languages, such as "C", "C++", "FORTRAN", "Pascal", and "VHDL".

Various computer-readable storage mediums, such as magnetic computer disks, optical disks, electronic memories and the like, may be prepared that may contain instructions that direct a device, such as a computer-based system, to implement the steps of method 500. Once an appropriate device has access to the instructions and contained on the computer-readable storage medium, the storage medium may provide the information and programs to the device, enabling the device to perform method 500.

As an example, if a computer disk containing appropriate materials, such as a source file, an object file, an executable file or the like, were provided to a computer, the computer could receive the information, appropriately configure itself and perform the steps of method 500. The computer could receive various portions of information from the disk relating to different steps of method 500, implement the individual steps, and coordinate the functions of the individual steps.

Many modifications and variations of the System and Method for Increasing Signal-to-Noise Ratio in Optical Based Sensor Systems are possible in light of the above description. Therefore, within the scope of the appended claims, the System and Method for Increasing Signal-to-Noise Ratio in Optical Based Sensor Systems may be practiced otherwise than as specifically described. Further, the scope of the claims is not limited to the implementations and embodiments disclosed herein, but extends to other implementations and embodiments as may be contemplated by those having ordinary skill in the art.

We claim:

1. A method comprising the steps of:
passing a portion of an optical signal through an aperture of a sensor having a sensing element, wherein the portion of the optical signal that passes through the aperture is an inner portion of the optical signal and the portion of the optical signal that does not pass through the aperture is an outer portion of the optical signal;
producing a sensed signal by sensing the outer portion of the optical signal with the sensing element;
controlling the source of the optical signal using the sensed signal;
passing the inner portion of the optical signal through an optical isolation device, wherein the optical isolation device is a linear polarizer having a quarter-wave plate coupled thereto; and
detecting the inner portion of the optical signal with a detection element.

2. The method of claim 1, wherein the sensing element is ring-shaped, wherein the step of producing a sensed signal comprises sensing and integrating the outer portion of the optical signal about at least a first angle of the sensing element, wherein the first angle exceeds $\pi$ radians.

3. The method of claim 1, wherein the step of producing a sensed signal comprises sensing and integrating the outer portion of the optical signal over symmetrical segments of the sensing element.

4. The method of claim 1, wherein the step of controlling the source of the optical signal using the sensed signal comprises controlling the power level of the source of the optical signal.

5. The method of claim 1, wherein the sensor is a photodiode.

6. The method of claim 1, wherein the inner portion of the optical signal has a total noise source that correlates to a total noise source of the outer portion of the optical signal.

7. The method of claim 1, wherein the optical isolation device is coupled to the sensor.

8. The method of claim 1, wherein at least one side of the optical isolation device has an anti-reflective coating.

9. A system comprising:
an optical energy source configured to produce an optical signal having a power level;

a sensor having an optical sensing portion and an aperture therein, the optical sensing portion configured to sense at least a portion of the optical signal that does not pass through the aperture;

an optical isolator coupled to the sensor in the path of the optical signal, wherein the optical isolator is a linear polarizer having a quarter-wave plate coupled thereto; and a detection element located adjacent to the optical isolator in the path of the optical signal wherein the sensor is configured to produce a sensed signal by sensing the at least a portion of the optical signal that does not pass through the aperture with the optical sensing portion wherein the sensor is configured to transmit the sensed signal to the optical energy source and the optical energy source is configured to receive the sensed signal and use the sensed signal to control the power level of the optical signal.

10. The system of claim 9, wherein the aperture is circular in shape and the optical sensing portion surrounds at least a portion of the perimeter of the aperture, wherein the optical sensing portion surrounding at least a portion of the perimeter of the aperture exceeds $\pi$ radians.

11. The system of claim 9, wherein at least one side of the optical isolator has an anti-reflective coating.

12. The system of claim 9, wherein the aperture is tapered from a first diameter to a second diameter, where the first diameter is greater than the second diameter, wherein the first diameter is located proximate to the optical energy source.

13. A system comprising:

an optical energy source configured to produce an optical signal; and a sensor operatively coupled to the optical energy source, the sensor having an optical sensing portion and an aperture therein, the sensor configured to sense a first portion of the optical signal and to allow a second portion of the optical signal to pass through the aperture;

a controller operatively coupled to the sensor;

an optical isolator coupled to the sensor in the path of the optical signal, wherein the optical isolator is a linear polarizer having a quarter-wave plate coupled thereto; and a detection element located adjacent to the optical isolator in the path of the optical signal wherein the sensor is configured to produce a sensed signal by sensing the first portion of the optical signal wherein the sensor is configured to transmit the sensed signal to the controller and the controller is configured to control the optical energy source based upon the sensed signal.

14. The system of claim 13, wherein the aperture is circular in shape and the optical sensing portion surrounds at least a portion of the perimeter of the aperture.

15. The system of claim 13, wherein the sensor is a monitor photodiode.

16. The system of claim 13, wherein at least one side of the optical isolator has an anti-reflective coating.

17. The system of claim 13, wherein the aperture is tapered from a first diameter to a second diameter, where the first diameter is greater than the second diameter, wherein the first diameter is located proximate to the optical energy source.

* * * * *